(12) United States Patent
Nakamiya et al.

(10) Patent No.: US 8,537,500 B2
(45) Date of Patent: Sep. 17, 2013

(54) MAGNETIC DISK DEVICE

(75) Inventors: Teruhiro Nakamiya, Kanagawa (JP);
Keiko Watanabe, Ibaraki (JP);
Toshihiko Shimizu, Ibaraki (JP);
Noritaka Ootake, Kanagawa (JP);
Takeji Sumiya, Kanagawa (JP); Takashi Tomita, Kanagawa (JP); Takahisa Okada, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 174 days.

(21) Appl. No.: 12/981,254

(22) Filed: Dec. 29, 2010

(65) Prior Publication Data

US 2012/0170155 A1    Jul. 5, 2012

(51) Int. Cl.
*G11B 5/48*    (2006.01)
*G11B 21/21*    (2006.01)

(52) U.S. Cl.
USPC .................................................. 360/265.9

(58) Field of Classification Search
USPC ............................... 360/265.7–266
See application file for complete search history.

(56) References Cited

U.S. PATENT DOCUMENTS

| 5,894,381 | A | 4/1999 | Allen et al. | |
|---|---|---|---|---|
| 5,936,808 | A * | 8/1999 | Huang et al. | 360/265.9 |
| 6,816,343 | B1 * | 11/2004 | Oveyssi | 360/265 |
| 7,248,468 | B1 | 7/2007 | Hsu | |
| 7,460,340 | B2 * | 12/2008 | Tanizawa et al. | 360/265.8 |
| 2002/0006009 | A1 * | 1/2002 | Ooi et al. | 360/77.07 |
| 2003/0053261 | A1 * | 3/2003 | Thia et al. | 360/266 |
| 2006/0221504 | A1 | 10/2006 | Hanya et al. | |
| 2007/0291416 | A1 | 12/2007 | Hayashi et al. | |
| 2009/0109576 | A1 | 4/2009 | Kuwajima | |

FOREIGN PATENT DOCUMENTS

| JP | 63/119076 | | 5/1988 |
|---|---|---|---|
| JP | 10027438 A | * | 1/1998 |
| JP | 11/053856 | | 2/1999 |
| JP | 11066773 A | * | 3/1999 |
| JP | 11/185415 | | 7/1999 |
| JP | 2005/018965 | | 1/2005 |
| JP | 2005/216473 | | 8/2005 |
| JP | 2007/109377 | | 4/2007 |

OTHER PUBLICATIONS

English-machine translation of JP 10-027438 A to Koriyama, published on Jan. 27, 1998.*
Usui, K et al., "Reduction of external vibration in hard disk drives using adaptive feed-forward control with single shock sensor", Usui, K. et. al., *"Reduction of external vibration in hard disk drives using adaptive feed-forward control with single shock sensor"* 9th IEEE International Workshop on Advanced Motion Control. 2006, pp. 138-143 <http://ieeexplore.ieee.org/stamp/stamp.j, (2006),138-143.

(Continued)

*Primary Examiner* — Will J Klimowicz

(57) ABSTRACT

A magnetic disk device including a disk, a spindle motor, a base for supporting the spindle motor and the disk, a slider includes a head element. The device also includes an actuator including arms for supporting the slider and a coil of a voice coil motor for rotating the arms, wherein a first natural bending frequency of the coil is less than a first natural bending frequency of the arms.

5 Claims, 14 Drawing Sheets

(56) References Cited

OTHER PUBLICATIONS

Lui, Mengjun et al., "A Model for a Hard Disk for Vibration and Shock Analysis", Lui, Mengjun. et. al. *"A Model for a Hard Disk for Vibration and Shock Analysis"* IEEE Transactions on Magnetics vol. 44, No. 12, Dec. 2008, pp. 4764-4768 <http://ieeexplore.ieee.org/stamp/stamp.jsp?tp=&arnumber=4711297&isnumber=4733281, (Dec. 2008),4764-4768.

Kuwajima, H et al., "Development of balanced type high shock suspension for 0.85-in hard disk drive", Kuwajima, H. et. al. *"Development of balanced type high shock suspension for 0.85-in hard disk drive"* IEEE Transactions on Magnetics, vol. 42, No. 2, Feb. 2006, pp. 255-260 <http://ieeexplore.ieee.org/stamp/stamp.jsp?tp=&arnumber=1580684&isnumber=333, (Feb. 2006),255-260.

Takahashi, H et al., "Adopting taguchi method on head suspension assembly for mobile hard disk drives", Takahashi, H. et. al. *"Adopting taguchi method on head suspension assembly for mobile hard disk drives"* Asia-Pacific Magnetic Recording Conference (APMRC), Aug. 16-19, 2004, pp. 62-63. http://ieeexplore.ieee.org/stamp/stamp.jsp?tp=&arnumber=1521951&isn, (Aug. 16-19, 2004),62-63.

Tunstall, G et al., "Head-media interface instability under hostile operating conditions", Tunstall, H. et. al. *"Head-media interface instability under hostile operating conditions"* IEEE Transactions on Istrumentation and Measurement, vol. 51, No. 2, Apr. 2002, pp. 293-298. <http://ieeexplore.ieee.org/stamp/stamp.jsp?tp=&arnumber=997827&is, (Apr. 2002),293-298.

Sohn, Jin-Seung et al., "Experimental analysis if HDD actuator for the improvement of shock realibility", Sohn, Jin-Seung. et. al. *"Experimental analysis if HDD actuator for the improvement of shock realibility,"* Asia-Pacific Conference (APMRC), Dec. 2000, pp. MP12/1-MP12/2. <http://ieeexplore.ieee.org/stamp/stamp.jsp?tp=&arnumber=898948&isnumber=.19470, (Dec. 2000),MP12/1-MP12/2.

Du, Chunling et al., "Robust H8 compensation for external vibration on hard disk drives on mobile applications", Du, Chunling. et. al., *"Robust H8 compensation for external vibration on hard disk drives on mobile applications,"* 10th IEEE International Workshop on Advanced Motion Control, Mar. 26-28, 2008, pp. 260-265. <http://ieeexplore.ieee.org/stamp/stamp.jsp?, (Mar. 26-28, 2008),260-265.

Jang, G H., "Finite Element Shock Analysis of an Operating HDD Considering the Flexibility of the Spinning Disk-Spindle, the Head-Suspension-Actuator and the Supporting Structure", Jang, G.H. et. al. *"Finite Element Shock Analysis of an Operating HDD Considering the Flexibility of the Spinning Disk-Spindle, the Head-Suspension-Actuator and the Supporting Structure"* Asia-Pacific Magnetic Recording Conference, Dec. 1, 2006, pp. 1-2.

\* cited by examiner

1200

```
DETERMINE A FIRST NATURAL BENDING FREQUENCY OF A COIL
1210
             ↓
DETERMINE A FIRST NATURAL BENDING FREQUENCY OF THE ARMS
1220
             ↓
GENERATE AN ANTI-RESONANCE BASED ON THE FIRST NATURAL BENDING FREQUENCY
OF SAID COIL AND THE FIRST NATURAL BENDING FREQUENCY
1230

MATCH THE FIRST NATURAL BENDING FREQUENCY OF THE COIL TO THE FIRST
    NATURAL BENDING FREQUENCY OF THE ARMS
    1232

LOWER A FIRST NATURAL BENDING FREQUENCY OF THE COIL TO LESS THAN A
    FIRST NATURAL BENDING FREQUENCY OF THE ARMS
    1234
             ↓
MATCH THE ANTI-RESONANCE WITH A BASE MODE
1240

MATCH THE ANTI-RESONANCE WITH THE BASE MODE IN A RANGE OF 1 KHZ TO 2
    KHZ
    1245
```

FIG. 12

MAGNETIC DISK DEVICE

BACKGROUND

Anti-shock performance for hard disk drives (HDDs) is very important. For example, due to shock, head sliders can hit the disk and subsequently damage the disk. In particular, shock with a short duration, such as a shock induced on an electronic device falling and hitting a hard surface, can severely damage the electronic device.

BRIEF DESCRIPTION OF THE DRAWINGS

FIG. 12 illustrates an example of a method for reducing vibrations in a hard disk drive, in accordance with an embodiment of the present invention.

Figure 1:
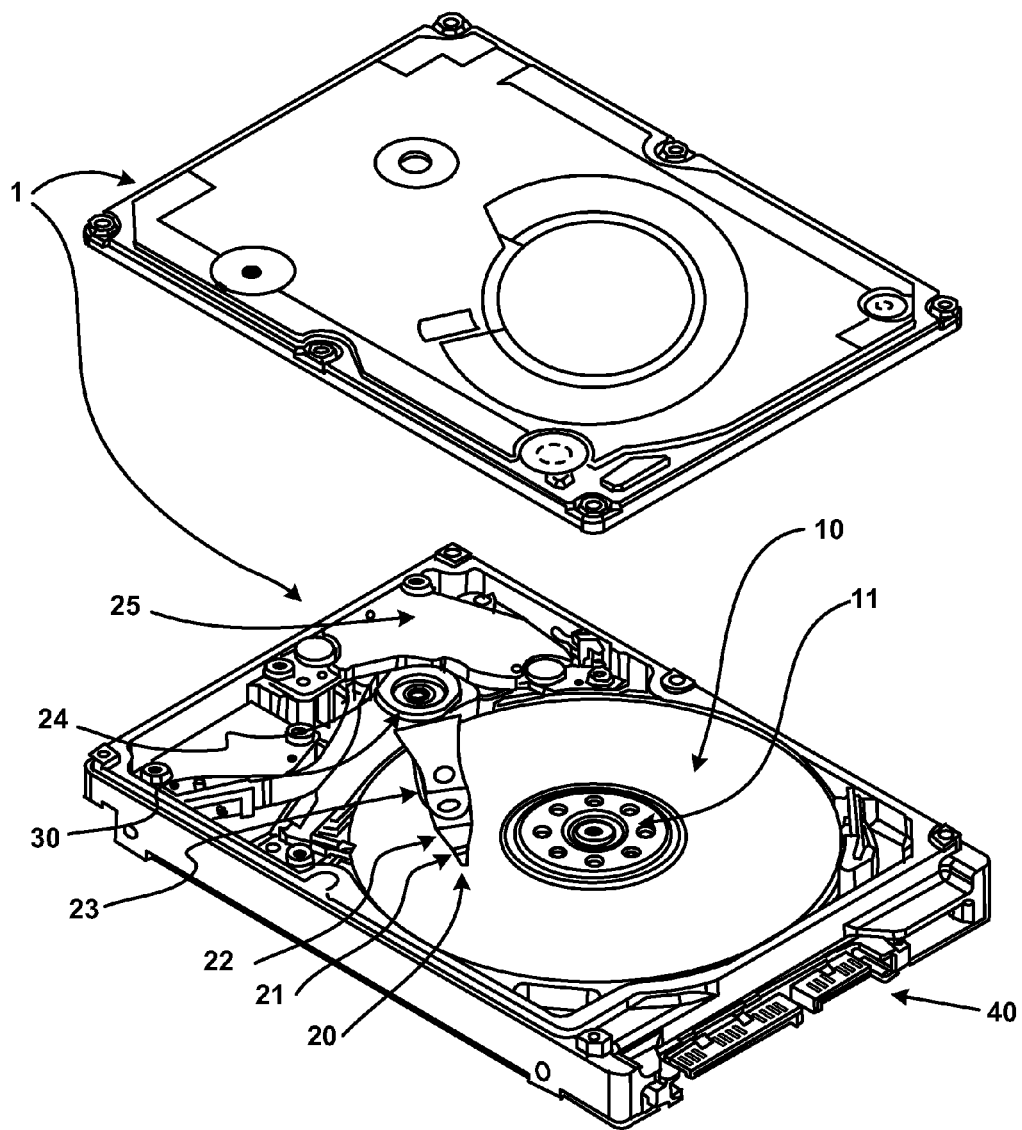
FIGS. 1 and 5 illustrate examples of a magnetic disk device, in accordance with embodiments of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Large-capacity magnetic disk devices or hard disk drives (HDDs) are essential in current computer systems, and they are widely used in servers and desktop PCs and notebook PCs etc. Among these, the magnetic disk devices installed in notebook PCs need to have high shock resistance as well as a high recording capacity. The portability of notebook PCs has improved as they have become more compact. As such, high shock resistance is desired because they are likely to suffer large shocks.

In magnetic disk devices, magnetic information, which is written concentrically onto a disk, is read and written by a head element embedded in a slider. The disk is driven in standing rotation by a spindle motor, and the slider is supported on an actuator by way of suspension. The actuator is a structure that can be driven in rotation by means of a voice coil motor. Therefore, it constitutes a mechanism which can position the head element at any point on the disk.

The slider having the head element floats above the disk under a lifting force produced by the flow of air which accompanies the rotation of the disk. The disk and the slider do not come into contact. Meanwhile, the suspension which supports the slider is employed in a folded state. The slider is pressed toward the disk by the restoring force produced by elastic deformation caused by this folding, i.e. spring force. The lifting force produced by the flow of air and the spring force produced by the suspension are balanced, and the slider floats over the disk.

When the magnetic disk device is subjected to a shock input, the disk and actuator vibrate strongly. When the shock input direction is parallel to the surface of the disk, the actuator simply moves over the disk, and there is no physical contact between the slider and the disk. On the other hand, when the shock is received from the direction perpendicular to the surface of the disk, an inertial force acts on the slider, which may be moved away from the disk, or conversely strongly pressed against the disk. Furthermore, the disk and the actuator vibrate in the disk out-of-plane direction, and therefore the amount of folding of the suspension varies depending on the phase relationship thereof, and the force whereby the suspension presses the slider toward the disk is weakened or strengthened. In this situation, the balance between the lifting force produced by the flow of air and the spring force produced by the suspension is upset, so the slider may no longer be able to float in a stable manner. If the force which presses the slider toward the disk is strengthened, the amount of floating is reduced, and therefore the lifting force produced by the flow of air is increased. Although the balance between the lifting force and the spring force is not often upset, if the force which presses the slider toward the disk is weakened, the amount of floating increases, and the lifting force decreases. Therefore the balance of force is easily upset. In one scenario, the floating position of the slider may be upset to the extent that the slider and the disk come into contact. The disk is rotating at high speed, and therefore this contact causes a large amount of damage. For example, contact marks from the slider are formed on the disk, and the slider is damaged. If the contact marks from the slider are deep, it may no longer be possible to read the magnetic information written onto the disk, and the function as a magnetic disk device is impaired.

Preventive measures which have been considered include a measure whereby the amount of deformation of the suspension is increased so that the slider is strongly pressed by the disk before the shock input, and a measure whereby the disk and the actuator are made more rigid so that the vibrational response to the shock is reduced.

In the case of the first measure, there is a limit to the disk pressing force of the slider, and it cannot be endlessly increased. To be more specific, if the case is considered in which the stable floating of the slider is upset and the slider and the disk come into contact, then if the pressing force is larger, the contact between the slider and the disk will be stronger. Therefore, there are problems in that the disk and the slider will be more likely to suffer damage. Furthermore, if magnetic information is not being read or written, the head is withdrawn from over the disk to above a plastic member known as a ramp, but if the pressing force is large, there are problems in that the friction force with the ramp increases. Accordingly, the ramp is subjected to wear, and abrasion powder is likely to be released.

In the case of the second measure, there is a limit to increasing the rigidity of the disk and actuator because of the size constraints of the magnetic disk device. In recent years there has also come to be a need to improve shock resistance performance to short period shocks which are often encountered in actual usage environments, and these kinds of shocks excite the components at higher natural frequencies, and therefore there are problems in that the issue cannot be avoided simply by increasing the rigidity.

In one embodiment, the vibration of the disk and the actuator is reduced by not requiring an increase in rigidity to the disk and/or actuator.

In conventional systems, recent disks have tended to become thicker and more rigid, and there is a new problem due to a phenomenon whereby the natural frequency of disk/base systems including a disk and a base for supporting the disk has risen and is close to the natural frequency of the actuator, and this causes resonance.

The shock resistance performance of a magnetic disk device is specified for the half-sine shock input. In magnetic disk devices for mobile applications which are mainly used in notebook PCs, shock input application durations of 2 milliseconds (ms) and 1 ms are considered. When the shock response spectrum is analyzed, there is a large amount of excitation around 400 Hz in the case of a shock input application time of 2 ms. When the shock input application time is 1 ms, there is a large amount of excitation around 800 Hz. A shock which has a shock input application time of 2 ms is produced when the device is dropped onto a soft floor such as a carpet. On the other hand, a shock which has a shock input application time of 1 ms is produced when the device is dropped onto a harder floor.

In the actual usage environment, shocks with a shorter shock input application time are more likely to occur. In one embodiment, resistance to shocks with an input application time of 0.5 ms is considered. When the shock input application time is 0.5 ms, shock response spectral analysis shows that excitation is likely to occur around 1600 Hz. The natural frequency of disk/base systems is moving to around 1600 Hz as recent disks become more rigid. Furthermore, the natural frequency of actuators is also around 1600 Hz because of size constraints. Both are in a situation where resonance is likely to occur.

In one embodiment, the magnetic disk device includes a disk; a spindle motor for driving the disk in rotation; a head element for reading and writing magnetic information which is written on the disk; a slider comprising the head element; an actuator for supporting the slider and moving the slider in rotation; and a base for supporting the spindle motor and also for supporting the actuator by way of a pivot shaft; the actuator comprises arms which support the slider and a coil of a voice coil motor for driving the arms in rotation; the first natural bending frequency of the coil element is the same as or less than the first natural bending frequency of the arm elements, and the first natural bending frequency of the arms is set to be greater than the second mode natural frequency of the base in which mainly the pivot shaft section of the base vibrates, or greater than the second mode natural frequency of the base drum in which the disk and the spindle motor section of the base vibrate in opposite directions.

In another embodiment, the magnetic disk device includes: a disk; a spindle motor for driving the disk in rotation; a head element for reading and writing magnetic information which is written on the disk; a slider comprising the head element; an actuator for supporting the slider and moving the slider in rotation; and a base for supporting the spindle motor and also for supporting the actuator by way of a pivot shaft; the actuator comprises arms which support the slider and a coil of a voice coil motor for driving the arm in rotation; the first natural bending frequency of the coil element is the same as or less than the first natural bending frequency of the arm elements, and the first natural bending frequency of the arms is set to be no more than 10% greater than the second mode natural frequency of the base in which mainly the pivot shaft section of the base vibrates; or greater than the second mode natural frequency of the base drum in which the disk and the spindle motor section of the base vibrate in opposite directions.

In a further embodiment, a device includes: a disk; a spindle motor for driving the disk in rotation; a head element for reading and writing magnetic information which is written on the disk; a slider comprising the head element; an actuator for supporting the slider and moving the slider in rotation; and a base for supporting the spindle motor and also for supporting the actuator by way of a pivot shaft; the actuator comprises arms which support the slider and a coil of a voice coil motor for driving the arm in rotation; the first natural bending frequency of the coil element is the same as or less than the first natural bending frequency of the arm elements; and the first natural bending frequency of the arms is set to be no more than 10% greater than the second mode natural frequency of the base in which mainly the pivot shaft section of the base vibrates; which is between 1000 and 2000 Hz, or greater than the second mode natural frequency of the base drum in which the disk and the spindle motor section of the base vibrate in opposite directions, which is between 1000 and 2000 Hz.

In one embodiment, the first natural bending frequency of the coil element of the actuator is less than the first natural bending frequency of the arm elements such that anti-resonance is produced. It is possible to reduce the vibration in the disk/base system and the actuator by matching the anti-resonance to the second mode natural frequency of the base or the second mode natural frequency of the base drum.

In each of the figures, the same components bear the same reference symbols, and duplications of the description will be avoided, as required, in order to make the description clearer.

FIG. 1 is an oblique exploded view schematically showing the configuration of a magnetic disk device 1 according to an embodiment. The magnetic disk device 1 comprises: a disk 10 on which magnetic information is written; a spindle motor 11 for driving the disk in rotation; a slider 21 having a head element 20 for reading and writing magnetic information; and suspension 22 and arms 23 for supporting the slider; the head/actuator assembly is made up of the slider 21, suspension 22 and arms 23. The actuator can generate electromagnetic force with a magnetic circuit 25 of a voice coil motor when a coil 24 is energized, and can move in rotation. Therefore, the head element 20 can be positioned at a prescribed position on the disk 10. The actuator is supported on a base 40 by way of a pivot shaft 30, and the spindle motor 11 is also supported on the base 40.

Figure 2:
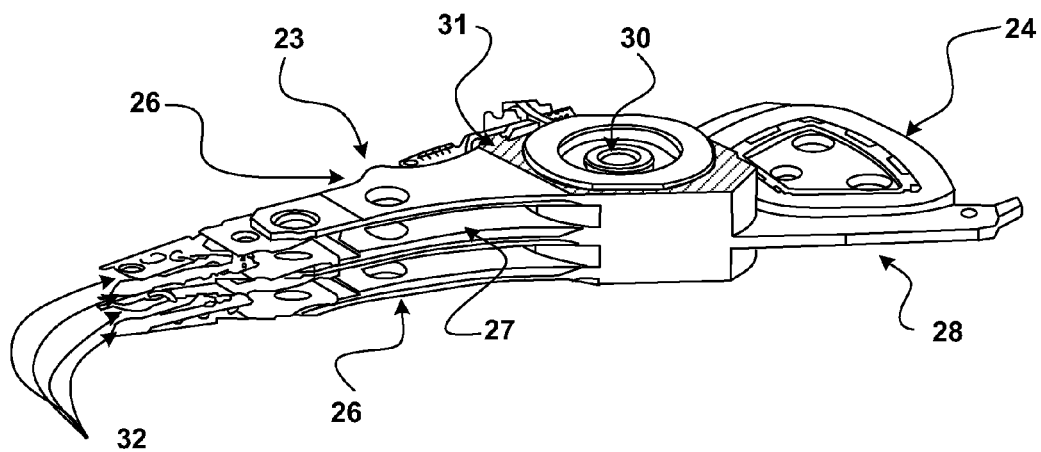
FIGS. 2 and 3 illustrate examples of an actuator, in accordance with embodiments of the present invention.

FIG. 2 illustrates the actuator according to an embodiment. The actuator comprises the arms 23 and coil 24, as described above. Furthermore, the coil 24 is fixedly bonded to a coil support 28. In various embodiments, there is more than one arm 23. The arm closest to the base 40 and the arm furthest away from the base 40 are referred to as end arms 26. The arm in the middle is referred to as the middle arm 27. In FIG. 2, there is only one middle arm, but there may be no middle arm or there may be more than one. The end arms are the same thickness and the middle arms are also the same thickness. Therefore, the natural frequencies of the end arms and middle arms are equal. The section of the actuator which can move in rotation is supported by the pivot shaft 30 by way of a pivot bearing.

Provided below is a description related to determining frequencies of different components. For example, natural bending frequencies of components are determined by vibration analysis. It should be appreciated that the frequencies of the components can be set with respect to each other or otherwise matched. This can be accomplished, in part, by changing the physical properties of the components such as changing the geometry or materials of the components.

A description will be given next of the first natural bending frequency of the arm elements and the coil element. In FIG. 2, when an upper/lower surface 31 of the section of the actuator which moves in rotation is completely fixed and the disk-facing surfaces 32 of the slider 21 are fixed, a vibration analysis is carried out. As such, it is possible to obtain the natural frequency of the arm elements and the coil element. When the actual measurements are taken, the disk-facing surfaces 32 of the slider may be attached to a fixture and the upper/lower surface 31 of the section the actuator which moves in rotation may be clamped to fix it in the fixture. Vibration is applied by a vibration tester, and then the natural frequency can be measured.

In the actuator, the first natural bending frequency of the coil element is set to be the same as or less than the first natural bending frequency of the arm elements. The arms are normally longer than the coil and the arms are normally thinner in order to balance the center of gravity of the actuator. Therefore, the natural frequency of the arm elements is less than the natural frequency of the coil element. However, the first natural bending frequency of the coil element can be made the same as or less than the first natural bending frequency of the arm elements by thinning the coil support section or changing from the existing aluminum to a member of lower rigidity, while increasing the natural frequency of the arm elements as far as possible within the size constraints.

The first natural bending frequency of the end arm elements is obtained by fixing the upper/lower surface 31 of the section of the actuator. In one embodiment, the end arm elements can move in rotation of 1.77 kHz. In another embodiment, the first natural bending frequency of the middle arm element is 1.72 kHz. The first natural bending frequency of the end arms and middle arms is made consistent in order to reduce vibration of the arms. The first natural bending frequency of the coil element is 1.67 kHz, so the first natural bending frequency of the coil element is set to be lower than the first natural bending frequency of the arm elements. In order to reduce the first natural bending frequency of the coil element, the coil element is made reasonably thin.

In a conventional actuator, the coil support section is 37% thicker than the actuator according to embodiments of the present invention. The first natural bending frequency of the coil element is 2.69 kHz. The first natural bending frequency of the coil element is greater than the first natural bending frequency of the arm elements.

Figure 3:
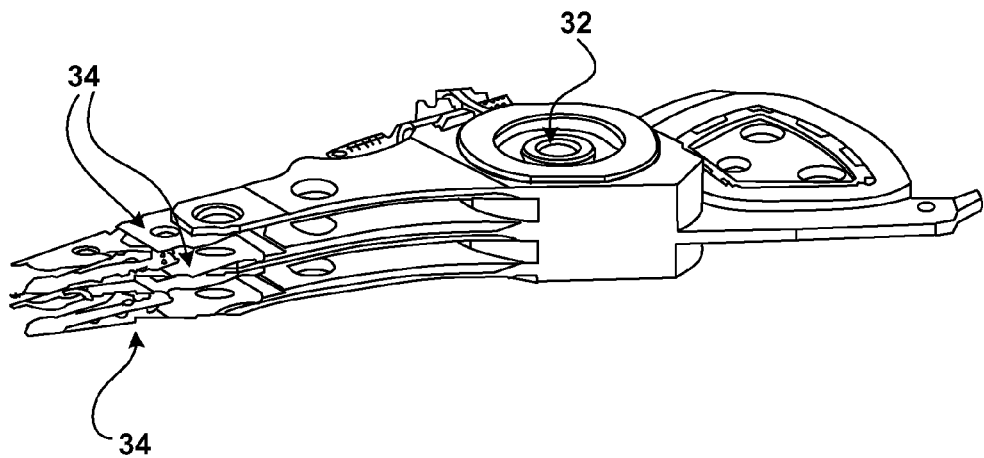

The first natural bending frequency of the arms will be described next. FIG. 3 again shows the actuator according to an embodiment of the present invention. When an upper/lower surface 31 of the section of the actuator and the disk-facing surfaces 32 of the slider 21 are fixed, vibration analysis is carried out. It is possible to obtain the natural vibration mode with the arms and coil coupled. The minimum first natural bending frequency obtained under conditions in which the upper/lower surface 31 of the section of the actuator is fixed is referred to as the first natural bending frequency of the arms. These conditions are different from the conditions in which the upper/lower surface 31 of the section of the actuator which can move in rotation is fixed. Therefore, the conditions do not reach the natural vibration mode of the actual part elements, such as the first bending of the arm elements and coil element. It should be noted that the conditions in which the upper/lower surface 31 of the section of the actuator is fixed can actually be produced provided that this surface is clamped in a fixture.

Figure 4A:
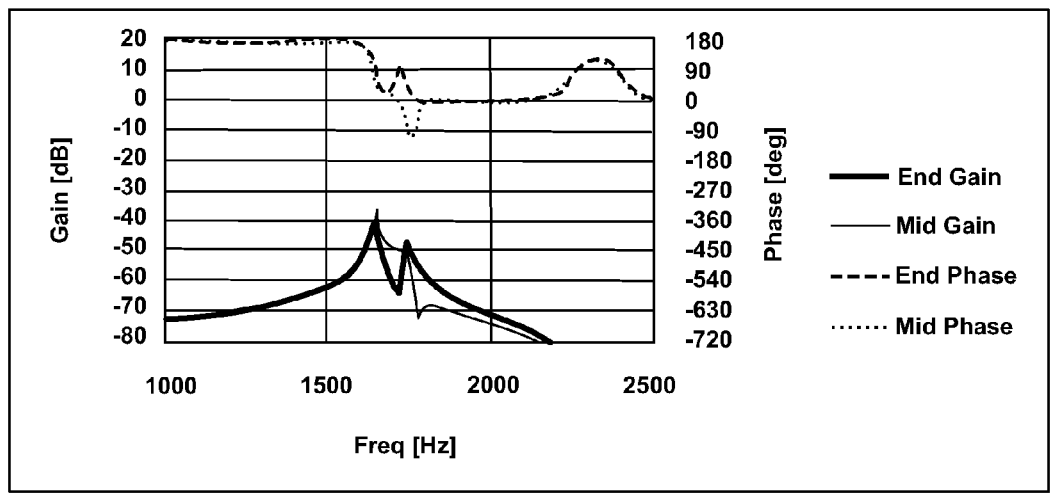
FIG. 4A illustrates an example of analysis results of arm response in a conventional actuator when the pivot shaft upper/lower surface is fixed, in accordance with an embodiment of the present invention.
Figure 4B:
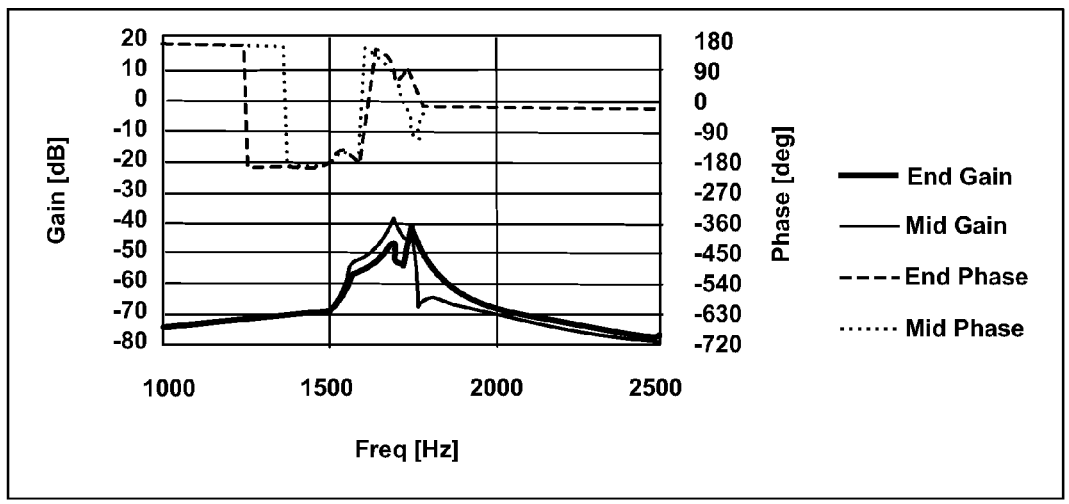
FIG. 4B illustrates an example of analysis results of arm response in an actuator when the pivot shaft upper/lower surface is fixed, in accordance with an embodiment of the present invention.

FIG. 4B shows the frequency response of the out-of-plane displacement of the arm tip ends 34 when subjected to displacement excitation, under conditions in which the upper/lower surface 31 of the section of the actuator is fixed. In other words, FIG. 4B shows the analysis results in the case of the actuator according to an embodiment of the present invention. FIG. 4A shows the analysis results in the case of a conventional actuator.

The first natural bending frequency of the arm of the conventional actuator is 1.65 kHz. On the other hand, the first natural bending frequency of the arm of the actuator according to an embodiment of the present invention is 1.56 kHz. If FIGS. 4A and 4B are compared, the maximum value of the peak gain of the vibrational response is −36 dB, so there is no difference. Furthermore, the frequency at which the peak gain is at a maximum is between 1.6 and 1.7 kHz, so there is no great difference.

However, in FIG. 4B, there is anti-resonance in the region of 1.5 kHz, and there is a difference in that there is a region where the vibrational response gain is low. This is because the first natural bending frequency of the coil element is the same as or less than the first natural bending frequency of the arm elements. It should be noted that peaks could be confirmed in the analysis of the conventional actuator in FIG. 4A at 1.75 kHz and 2.4 kHz, as well as at 1.65 kHz, but these were not apparent in the natural vibration mode response in which the arms 23 and coil 24 vibrate.

If we consider the shock response of the magnetic disk device, the influence of the disk/base system cannot be ignored. The results in FIG. 4B constitute results for the actuator element, and the vibrational response of the disk/base system matches these. Embodiments of the present invention are characterized in that the anti-resonance obtained when the actuator was investigated matches the natural frequency of the disk/base system. This point will be described below.

Figure 5:
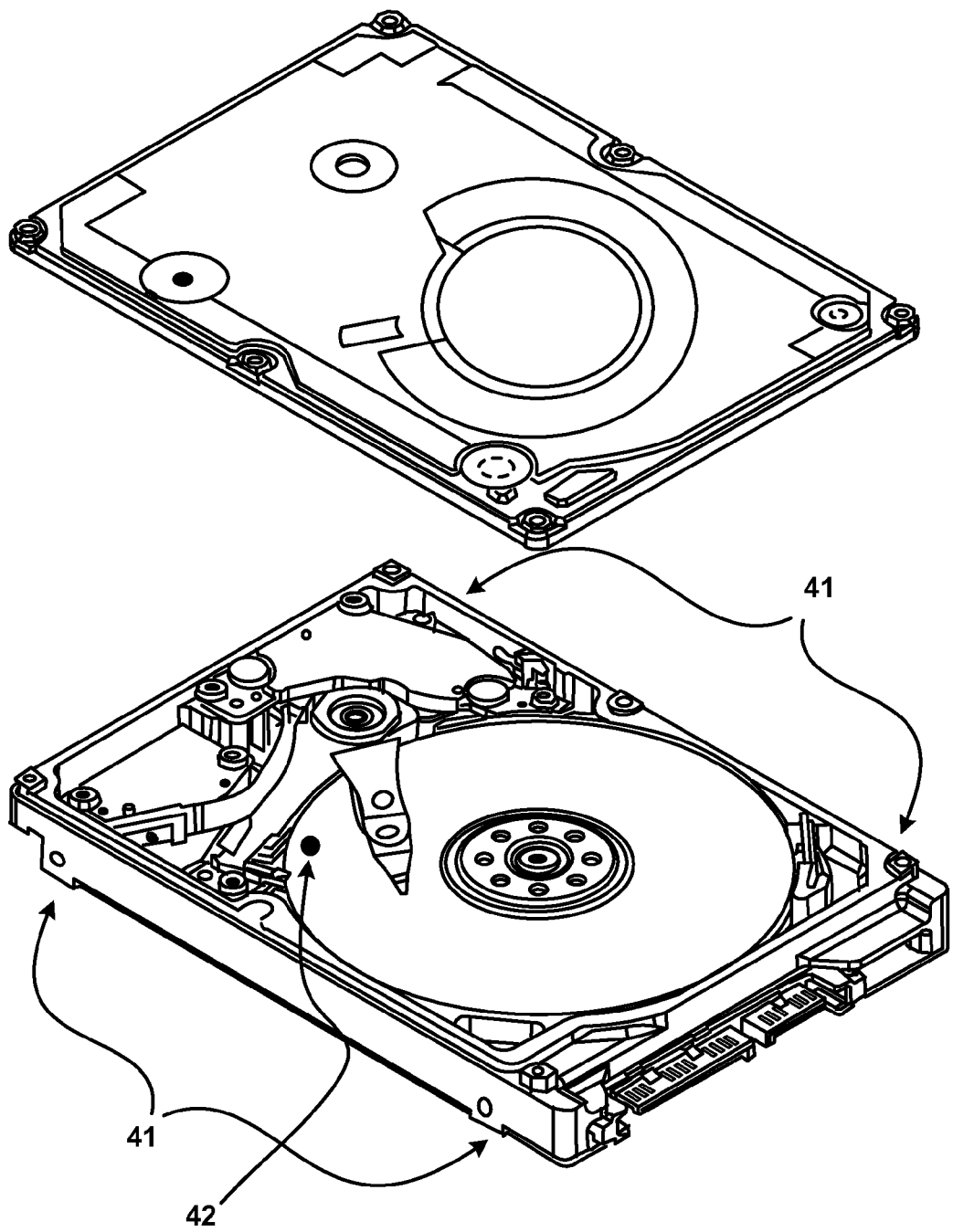
Figure 6:
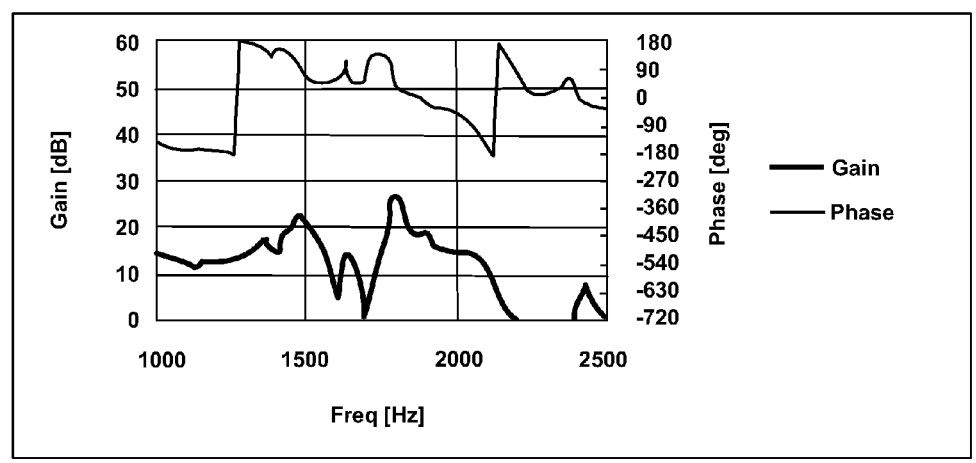
FIG. 6 illustrates an example of analysis results of disk outer periphery response in the conventional case when the screw regions on the base side surface are fixed, in accordance with an embodiment of the present invention.
Figure 7A:
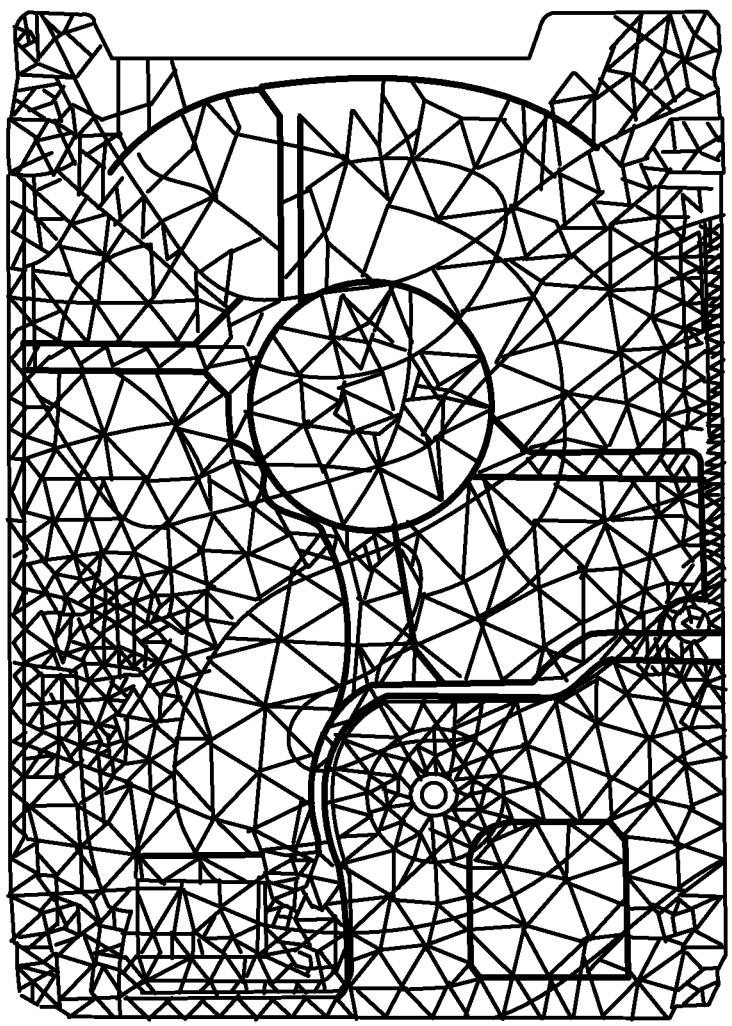
FIG. 7A illustrates an example of the second base mode at 1.5 kHz, in accordance with an embodiment of the present invention.
Figure 7B:
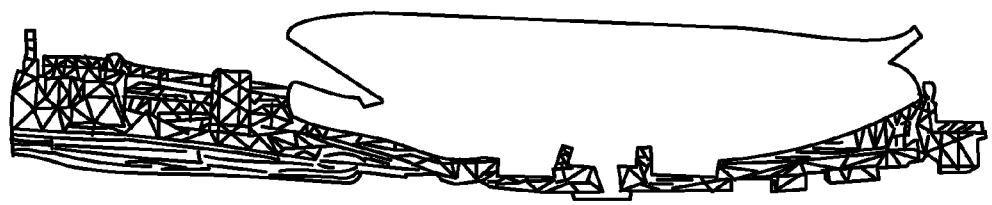
FIG. 7B illustrates an example of the cross section of the second drum mode at 1.8 kHz, in accordance with an embodiment of the present invention.

FIG. 6 shows the frequency response of the out-of-plane displacement at a point 42 on the outer periphery of the disk when vibration analysis is carried out with fixing of the magnetic disk device including the base shown in FIG. 5 in the fixing screw regions 41 on the side surface of the base. There are resonance peaks in the regions of 1.5 kHz and 1.8 kHz. FIGS. 7A and 7B show the natural vibration mode thereof. FIG. 7A shows the natural vibration mode of the base is in the region of 1.5 kHz. The black locations in the contour drawing of the out-of-plane displacement show that there is a large amount of displacement on the positive side. The white locations show that there is a large amount of displacement on the negative side. As such, it is clearly a mode in which the base 40 in the region of the pivot shaft 30 vibrates up and down. This mode is referred to as the second base mode.

FIG. 7B depicts the natural vibration mode of the base in the 1.8 kHz region. The disk 10 and the base 40 which vibrate in opposite directions. This vibration mode is referred to as the second drum mode. Results this analysis can also be confirmed by fixing the base side surface in a fixture, applying excitation using a vibration tester, and measuring the vibrational response thereof at multiple points in order to draw the natural vibration mode. If we consider the size constraints of the base 40 and the mass balance of the disk 10, spindle motor 11, and actuator, the natural vibration mode of the disk/base system which is apparent in the region of 1.6 kHz is assumed to be only the second base mode and the second drum mode.

The anti-resonance is produced by setting the first natural bending frequency of the coil element to be the same as or less than the first natural bending frequency of the arm elements matching the second base mode or the second drum mode. The first natural bending frequency of the arms is therefore set to be higher than the natural frequency of the second base mode or second drum mode.

In one embodiment, the first natural bending frequency of the arms is 1.56 kHz and is set to be greater than 1.5 kHz which is the natural frequency of the second base mode. 1.5 kHz, which is the anti-resonance, matches the natural frequency of the second base mode.

Figure 8:
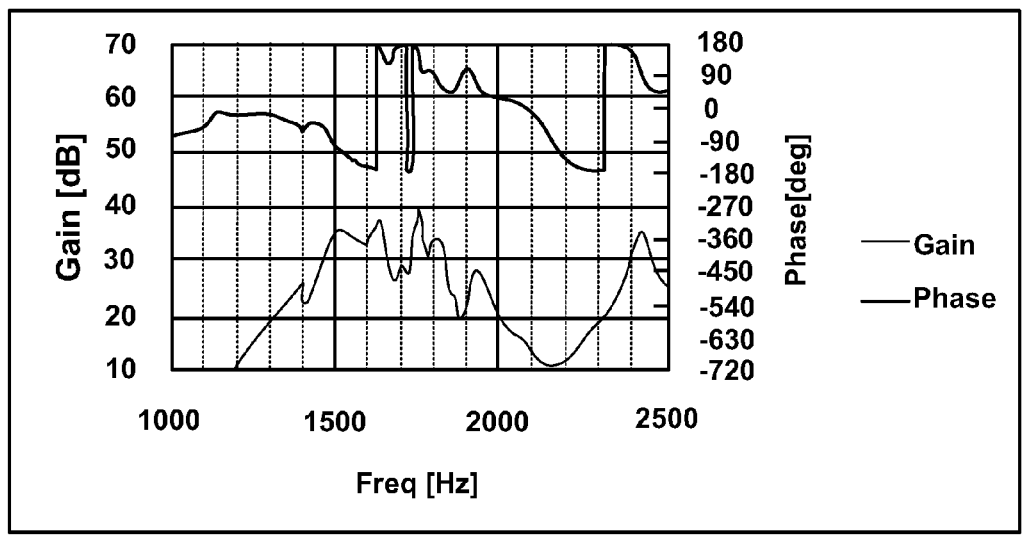
FIG. 8 illustrates an example of the analysis results of the disk outer periphery response in the conventional case when the screw regions on the base side surface are fixed, in accordance with an embodiment of the present invention.
Figure 9:
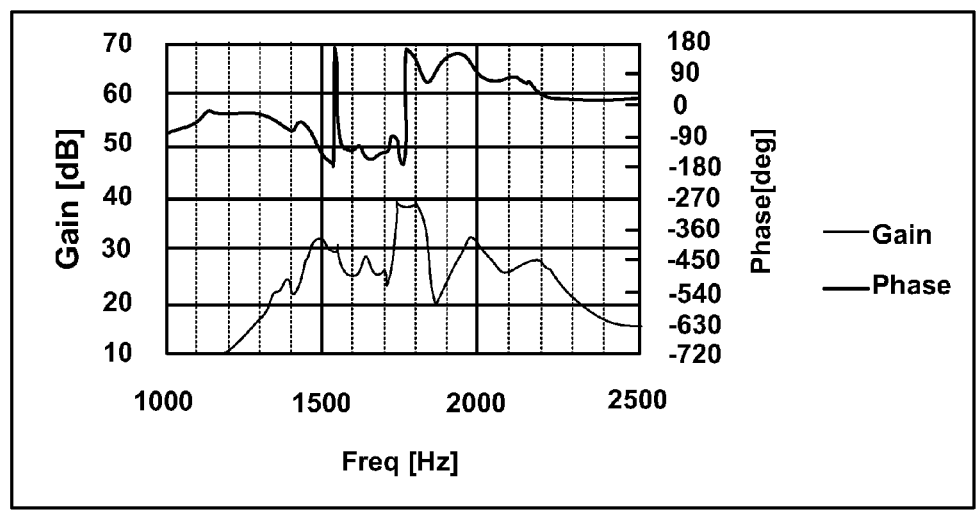
FIG. 9 illustrates an example of the analysis results of the arm response when the screw regions on the base side surface are fixed, in accordance with an embodiment of the present invention.

In order to confirm the effect, FIG. 8 shows the frequency response of the out-of-plane displacement at the tip ends of the arms when the conventional actuator and base were analyzed under the same conditions as in FIG. 6. FIG. 9 shows the frequency response of the out-of-plane displacement at the tip ends of the arms when the actuator and base were analyzed under the same conditions as in FIG. 6. Looking at FIG. 8, the shape shows that the vibration of the disk/base system and actuator are matching, which can be confirmed by the peak gains produced by the vibration of the disk/base system at 1.5 kHz and 1.8 kHz confirmed in FIG. 6, and the vibration of the actuator at 1.65 kHz, 1.75 kHz, and 2.4 kHz confirmed in FIG. 4A.

FIG. 9 shows the results of analysis calculated under the same conditions as in FIG. 6 for the magnetic disk device including the base, in accordance to an embodiment of the present invention. As described above, in the actuator according to an embodiment of the present invention, the first natural bending frequency of the coil element is less than the first natural bending frequency of the arm elements, and there is an anti-resonance region close to 1.5 kHz. The frequency of the anti-resonance matches the natural frequency of the second base mode. Therefore, the peak gain at 1.5 kHz in FIG. 8 is less than in the conventional case. FIG. 8 shows the conventional case, and if the 1.5 kHz gain is compared, it is 3 dB lower in the case of an embodiment of the present invention.

The results of analysis of the slider separation force from the disk when a half-sine wave of amplitude 250 G is input at a shock input application time of 0.5 ms will be described next. This value is the total amount of decrease in the inertial force exerted on the slider and the spring force of the suspension. There is decrease of 30% in the slider separation force from the disk in the case of the present embodiments, in contrast to the conventional case. This means that the shock resistance is improved by 30%.

Figure 10:
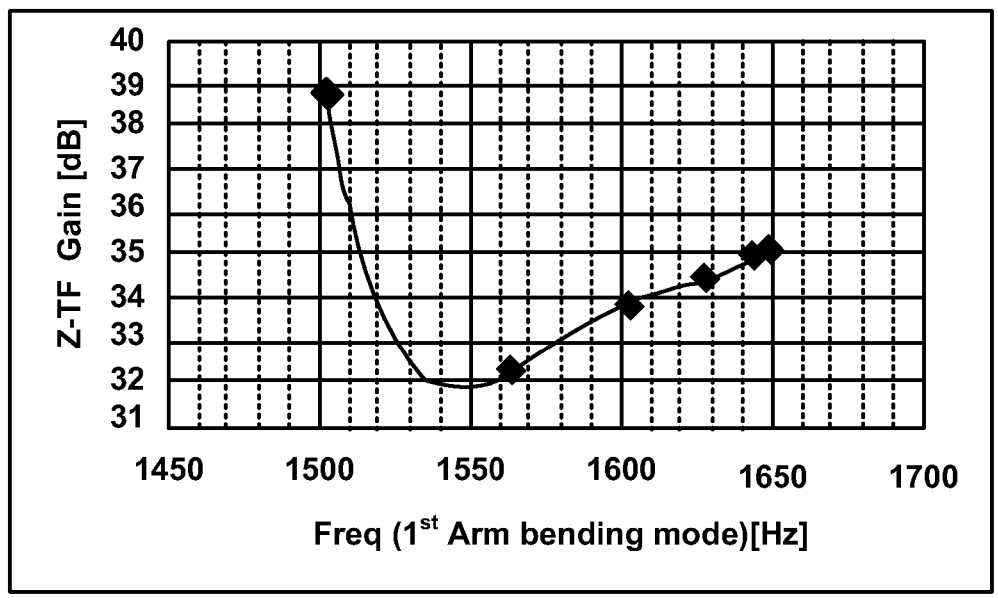
FIG. 10 illustrates an example of the analysis results of the slider separation force from the disk produced by the shock input when the first bending frequency of the arms is varied and when the screw regions on the base side surface are fixed, in accordance with an embodiment of the present invention.
Figure 11:
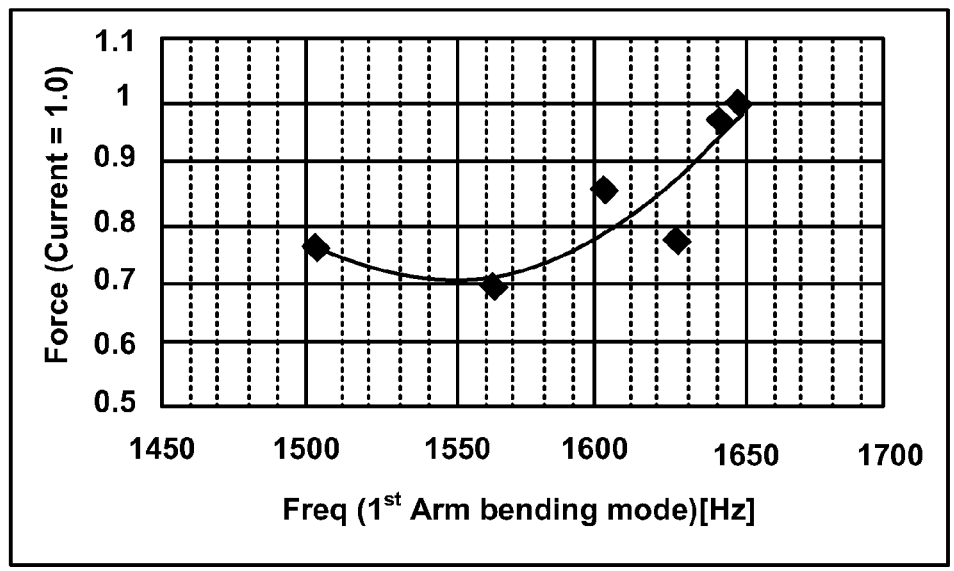
FIG. 11 illustrates an example of the analysis results of the variation in peak gain of the arm response in the region of 1.5 kHz when the first bending frequency of the arms is varied and when the screw regions on the base side surface are fixed, in accordance with an embodiment of the present invention.

FIGS. 10 and 11 show the results of analysis of the extent of the effect when the thickness of the coil support 28 is varied and the first bending frequency of the arms is varied. FIG. 10 involves the same conditions as in FIG. 6. In other words, the frequency response of the out-of-plane displacement at the point 42 on the outer periphery of the disk when vibration analysis is carried out with fixing of the fixing screw regions 41 on the side surface of the base, and a peak gain was read in the region of 1.5 kHz. The horizontal axis shows the first natural bending frequency of the arms, while the vertical axis shows the peak gain in the region of 1.5 kHz. A greater amount of decrease in the peak gain occurs from the region of 1.6 kHz and is up to 7% greater than for 1.5 kHz which is the natural frequency of the second base mode. FIG. 11 shows the results of analysis of the slider separation force from the disk when a half-sine wave of amplitude 250 G is input at a shock input application time of 0.5 ms. The horizontal axis shows the first natural bending frequency of the arms, while the vertical axis shows the slider separation force from the disk. In the same way as for the results in FIG. 10, a large decrease in the separation force was apparent from the region of 1600 Hz. These results show that a greater effect is demonstrated when the first natural bending frequency of the arms is up to 7% higher than the natural frequency of the second base mode, but since there are variations in the actual device, the effect is believed to be greater when the value is up to 10% higher than said natural frequency. From the above, it can be seen that the effect is greater when the first natural bending frequency of the arms is no more than 10% higher than the second base mode and second drum mode, which constitute the natural vibration mode of the disk/base system.

If we consider the effect which is achieved with respect to the size constraints and weight constraints of the magnetic disk device, and a shock input application time of 0.5 ms, the natural vibration mode of the disk/base system in this case may be thought of as lying between 1000 Hz and 2000 Hz.

FIG. 12 depicts a method 1200 for reducing vibrations in a hard disk drive. At 1210, a first natural bending frequency of a coil is determined. At 1220, a first natural bending frequency of the arms is determined.

At 1230, an anti-resonance is generated based on the first natural bending frequency of the coil and the first natural bending frequency. In one embodiment, at 1232, the first natural bending frequency of the coil is matched to the first natural bending frequency of the arms. In another embodiment, at 1234, a first natural bending frequency of the coil is lowered to less than a first natural bending frequency of the arms.

At 1240, the anti-resonance is matched with a base mode. In one embodiment, at 1245, the anti-resonance is matched with the base mode in a range of 1 kHz to 2 kHz.

It should be appreciated that embodiments of the present invention may be applied to disk drive devices which employ recording disks other than the magnetic disk device described above. Furthermore, the embodiments of the present invention may also be applied to disk drive devices for carrying out reproduction alone.

Various embodiments of the present invention are thus described. While the present invention has been described in particular embodiments, it should be appreciated that the present invention should not be construed as limited by such embodiments, but rather construed according to the following claims.

The invention claimed is:

1. A magnetic disk device comprising:
   a disk;
   a spindle motor;
   a base for supporting said spindle motor and said disk;
   a slider comprising a head element; and
   an actuator comprising:
      an arm for supporting said slider; and
      a coil of a voice coil motor for rotating said arm;
   wherein a first natural bending frequency of said coil is less than a first natural bending frequency of said arm, wherein said first natural bending frequency of said arm is greater than a second mode natural frequency of said base.

2. The magnetic device of claim 1, wherein said first natural bending frequency of said coil is 1.67 kHz.

3. The magnetic device of claim 1, further comprising:
   at least two sliders, each of said sliders comprising a head element; and
   said actuator comprising at least two arms for supporting said at least two sliders.

4. The magnetic device of claim 3, wherein a first natural bending frequency of each of said arms are substantially equal.

5. The magnetic device of claim 1, wherein said first natural bending frequency of said arm is 1.56 kHz.

* * * * *